Jan. 21, 1969     J. H. BOYDEN     3,423,695
GIANT PULSE LASER SYSTEM INCORPORATING DUAL Q-SWITCHING MEANS
Filed June 24, 1964

INVENTOR.
JAMES H. BOYDEN
BY
Elliott & Pastoriza
ATTORNEYS

United States Patent Office 3,423,695
Patented Jan. 21, 1969

3,423,695
GIANT PULSE LASER SYSTEM INCORPORATING DUAL Q-SWITCHING MEANS
James H. Boyden, Granada Hills, Calif., assignor to Union Carbide Corporation, a corporation of New York
Filed June 24, 1964, Ser. No. 377,675
U.S. Cl. 331—94.5
Int. Cl. H01s 3/11
3 Claims

ABSTRACT OF THE DISCLOSURE

A giant pulse laser system incorporates in its optical cavity an active Q-switching means adapted to be triggered by an external signal in combination with a passive Q-switching means responsive to initial incidence of radiation. The active Q-switching means comprises an electro-optical shutter and enables initial restoration of the Q of the cavity to be effected at a precise point in time. The radiation resulting upon this initial restoration of the Q will trigger the passive Q-switching means in the form of the dye to render it substantially transparent and thus completely restore the Q of the cavity. Cessation of the giant pulse results in the passive Q-switch returning to a substantially opaque condition almost immediately. As a result, a giant pulse may be precisely generated at a desired point in time and any "after lasing" is avoided by the passive Q-switch so that there results a "clean" pulse.

---

This invention relates generally to laser systems and more particularly to an improved Q-switching means for use in the optical cavity of a giant pulse laser.

Conventional lasers comprises a host crystal doped with a primary additive providing the laser ions. Regenerative means in the form of reflective end coatings or mirrors are positioned at the ends of the crystal to define an optical cavity. Light energy is optically pumped into the crystal resulting in an inverted population of the laser ions between two energy levels. When a given threshold or inverted state is attained, a stimulated emission of radiation of light from the crystal will occur. This stimulated emission is effectively generated by light passing back and forth through the crystal. The emitted light is of a frequency corresponding to the energy difference between the two energy levels.

The stimulated emission generated when the inverted population tends to return to its original state may be coupled out of the system by making one of the mirrors partially reflective or alternatively, providing a small opening in one end mirror.

A giant pulse laser is similar to the conventional laser described above except that an electro-optical shutter such as a Kerr or Pockels cell is incorporated in the optical cavity. This shutter essentially spoils the "Q" of the optical cavity by blocking light to permit a much greater inverted population level to be achieved in the laser crystal before stimulated emission takes place. At a given time during the light pumping cycle, an external trigger changes the state of the electro-optical shutter to render it substantially transparent so that the "Q" of the optical cavity is restored. Since a considerably higher energy level may be built up in the laser from the light pump source before laser action can take place as a consequence of the "Q-spoiling," when this energy is finally released upon triggering of the Kerr or Pockel cell, a giant pulse of radiation results. As a consequence of the "Q-spoiling" and restoring characteristics of such light shutters, they are often referred to as "Q-switches."

The use of an electro-optical shutter as a Q-switch has advantages in that it may be precisely timed and controlled with electronic circuits to provide synchronization of the high pulse of radiation with other events.

Many devices of the foregoing type, however, are not well suited to systems having very high optical gains in that the shutter cannot completely eliminate normal laser action with the result that "after lasing" may occur following a giant pulse. This difficulty is due to failure of the shutter to close completely, inhomogeneities in the impressed electric field, and to the sensitivity to variations in orientation, voltage, and temperature. The result may be low power output or inconsistency of operation from pulse to pulse.

In co-pending patent application Ser. No. 364,169, filed May 1, 1964, for Light Control Means For Use With A Giant Pulse Laser, assigned to the same assignee of the present invention there is described another method and means for "Q-switching" for use in the optical cavity of a laser to produce giant pulses. Essentially, this latter method and means is realized by utilizing an absorbing chemical substance such as an organic dye whose atomic properties are such that the absorbance may be saturated by a moderately strong light, thus "bleaching" the dye and thereby raising the internal gain of the cavity by a large amount. This property of the dye is regenerative when a laser is pumped and provides an automatic "Q-switch" if the concentration of the absorber is properly adjusted. The particular organic dye described in the foregoing mentioned copending patent application comprised kryptocyanine in a solution of methyl alcohol and was incorporated in the optical cavity of a ruby laser. A particular advantage of this latter means for controlling the "Q" of the optical cavity is that there is substantially no "after lasing." That is, the substance upon cessation of the giant pulse almost immediately turns to an opaque or absorptive condition so that a "clean" pulse is provided.

Since, however, the dye is automatically responsive to incident radiation, the time at which it "bleaches" or switches the "Q" of the cavity is not accurately predictable. In those instances in which it is desired to control precisely the point in time at which the giant pulse of radiation from a giant pulse laser is emitted, an organic dye type Q-switch is thus not always satisfactory.

With all of the foregoing in mind, primary objects of this invention accordingly are to provide an improved giant pulse laser system in which giant pulses of consistent peak power may be provided at precise points in time and in which normal laser action both prior and subsequent to emission of the giant pulse is substantially eliminated.

More particularly, it is an object to provide an improved "Q-switching" means for use in giant pulse lasers in which the advantageous features of electro-optical type switching means together with the advantageous features of the bleachable dye type switching means are realized without any of the disadvantages of either one alone.

Briefly, these and other objects and advantages of this invention are attained by combining an electro-optical type shutter with a reversible bleachable dye or absorber. The reversibly bleachable absorber improves the ability of the electro-optical shutter, such as a Kerr cell, to completely shut off normal laser action, but with proper adjustment, the output pulse may be generated upon opening of the electronically controlled shutter.

There is thus provided a precise means for timing the output of the pulse with the attendant advantages of a consistently high quality pulse with no prior or subsequent lasing action.

A better understanding of the invention will be had by now referring to one embodiment thereof as illustrated in the accompanying drawings, in which.

Figure 1:
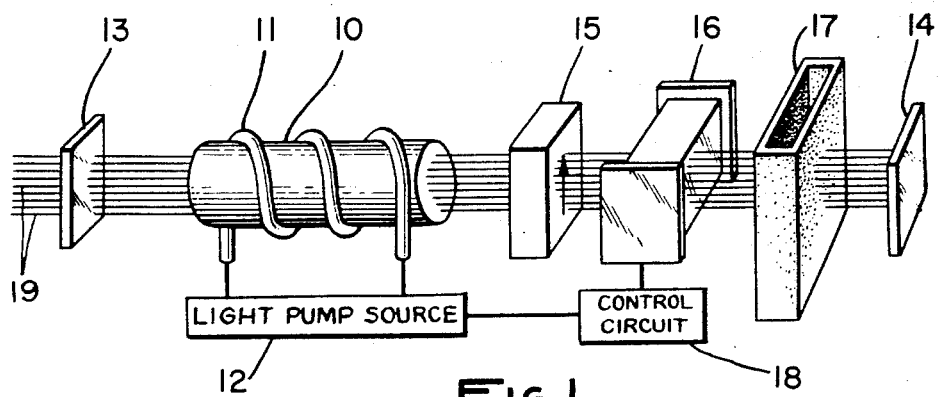
FIGURE 1 is a highly schematic representation of a giant pulse laser device incorporating the improved "Q-switching" means of this invention.

Referring first to FIGURE 1, there is shown a solid state laser crystal 10 surrounded by a spiral flash lamp 11 powered from a suitable light pump source 12. Regenerative means in the form of end mirrors 13 and 14, respectively, are provided to define an optical cavity for the laser 10. The improved "Q-switching" means for controlling the light in the optical cavity between the mirrors 13 and 14 includes a first Q-spoiling means which may take the form of a Kerr cell comprising a polarizer 15 and cell 16. A second Q-spoiling means in accordance with the one disclosed embodiment of the invention constitutes a reversibly bleachable chemical dye disposed within a quartz cell as indicated at 17. In the event that the laser crystal is ruby, the chemical dye in the cell 17 is preferably kryptocyanine dissolved in methyl alcohol. The concentration of the kryptocyanine may be of the order of $10^{15}$ molecules per cc. of methyl alcohol in a cell one centimeter in length. The kryptocyanine of this concentration exhibits a large absorption cross-section for the wave length of stimulated emission from the ruby crystal. The cell 16 is triggered at a desired point in time by an external triggering signal from a suitable control circuit 18. A giant pulse output of stimulated radiation is indicated at 19.

Figure 2:
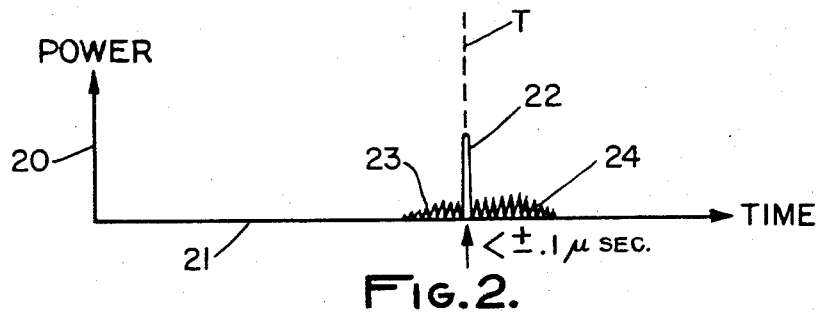
FIGURE 2 is a qualitative plot of a giant laser pulse resulting when an electro-optical shutter is employed alone.

Referring to FIGURE 2, there is shown a plot of power output vs. time on ordinant and abscissa scales 20 and 21. At a given time T there is shown a giant pulse 22 resulting from the laser system of FIGURE 1 in the absence of the bleachable dye Q-switching means. Thus, with the use of the Kerr cell 16 alone, the giant pulse 22 is emitted at a desired point in time T within ±.1 microsecond as indicated.

However, it will be noted that some normal laser action such as indicated at 23 may occur prior to the emission of the giant pulse. In addition, some low-power after-lasing action as indicated at 24 may occur. In a specific experiment, with the Kerr cell alone, the system yielded power outputs which varied as much as from 600 megawatts peak power to less than 200 megawatts between successive pulses. This result, as mentioned, is a consequence of the inability of the Kerr cell to consistently prevent normal laser action prior to the time of release of the giant pulse. In addition, even when the power output was fairly high there was a considerable amount of after lasing or low-power normal lasing as shown at 24, which arises because the Kerr cell remains open after its triggering for an appreciable fraction of the pumping time. As described heretofore, this after lasing in many instances is undesirable.

Figure 3:
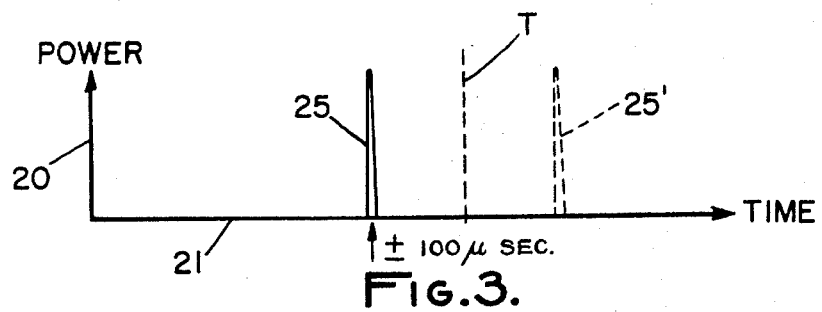
FIGURE 3 is a plot similar to FIGURE 2 illustrating a giant pulse resulting when a reversibly bleachable dye is employed alone.

In FIGURE 3, there is shown a giant pulse 25 resulting when the bleachable dye Q-switch 17 is used alone without the Kerr cell 16 and polarizer 15. It will be noted that the giant pulse is relatively "clean," there being no prior or subsequent lasing radiation. On the other hand, the bleachable dye alone results in a substantial variation in the time of the occurrence of the output. The only possible means of control is by rough adjustments of the pumping of the laser and the optical cavity parameters. Thus, the timing of the giant pulse may vary, for example, ±100 microseconds with respect to the desired point in time T as indicated by the dotted line pulse 25'.

Figure 4:
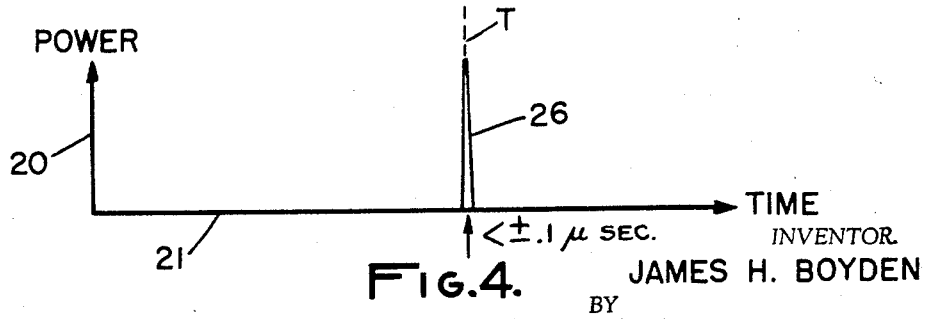
FIGURE 4 is a plot illustrating the giant pulse resulting when both the electro-optical shutter and reversibly bleachable dye are used in accordance with the present invention.

FIGURE 4 illustrates the results when both the Kerr cell and bleachable dye are employed together as shown in FIGURE 1. It will be noted that there is provided a clean pulse 26 without any prior or subsequent lasing at the precise point in time T that is desired.

In the experimental set-up described, when the laser was fired and the Kerr cell shutter triggered, a series of single high power pulses were obtained, consistently greater than 800 megawatts with no after lasing. In order to verify that the Kerr cell still controlled the generation of the pulse, the time delay between the electronic synchronization triggering signal to the Kerr cell from the control circuit 18 and the appearance of the output pulses was measured. It was determined that the variation in this time was less than .03 microsecond, the limit of resolution during the experiment in question. This variation compares with that when the bleachable dye alone is used which variation was as much as 200 microseconds as described.

It will be evident, accordingly, that the advantages of the bleachable dye providing consistent power output and the absence of normal lasing have been combined with the advantages of the Kerr cell relating to precise electronic timing of the output to provide an overall improved giant pulse laser system.

What is claimed is:

1. A giant pulse laser system for producing a high peak power pulse of radiation, comprising, in combination: a laser device including a laser material and regenerative means in spaced relationship along the axis of radiation to define an optical cavity; first control means positioned in said optical cavity along said axis for spoiling the Q of said optical cavity; means for generating a triggering signal at a given point in time connected to said first control means, said first control means being responsive to said signal to restore at least partially the Q of said optical cavity; second control means positioned in the same said optical cavity along said axis to intercept radiation in said optical cavity to spoil the Q thereof, said second control means being automatically responsive to initial radiation incident thereon upon triggering of said first control means to change from a substantially opaque condition to a substantially transparent condition to thereby completely restore the Q of said optical cavity whereby energy may be stored in said laser system to a given level and then released by said triggering signal at said given point in time to produce said high peak power pulse of radiation, cessation of said pulse returning said second control means back to a substantially opaque condition to thereby minimize any after lasing and provide a clean pulse.

2. A system according to claim 1, in which said first control means comprises an electro-optical shutter and said second control means includes a bleachable organic dye.

3. A giant pulse laser system for producing a high peak power pulse of radiation, comprising, in combination: a laser material; optical pumping means coupled to said material for effecting an inverted population state of laser ions in said material between given energy levels; regenerative means in the form of end mirrors exhibiting high reflectance spaced from opposite end portions of said laser material to define an optical cavity for stimulated emission; means for generating a triggering signal at a given point in time at which a desired inverted population level has been established in said laser material; a first optical control means comprising an electro-optical shutter positioned in said optical cavity between one of said end mirrors and said laser material and responsive to said triggering signal to change from a substantially opaque condition to a substantially transparent condition; and a second optical control means comprising a reversibly bleachable organic dye having a high absorption cross section at the wave length of said stimulated emission positioned in said optical cavity between said one end mirror and said electro-optical shutter and automatically responsive to an initial stimulated emission of radiation from said laser material through said electro-optical shutter upon triggering thereof to change from a substantially opaque condition to a substantially transparent condition to release said high peak power pulse of radiation at substantially said given point in time.

References Cited

UNITED STATES PATENTS

| | | | |
|---|---|---|---|
| 3,289,099 | 11/1966 | Masters | 331—94.5 |
| 3,292,102 | 12/1966 | Byrne | 331—94.5 |

OTHER REFERENCES

Sorokin et al., Ruby Laser Q-Switching Elements Using Phthalocyanine Molecules in Solution, IBM Journal of Research and Development, vol. 8, No. 2 (April 1964), pp. 182–184.

JEWELL H. PEDERSEN, *Primary Examiner.*

W. L. SIKES, *Assistant Examiner.*

U.S. Cl. X.R.

350—160